United States Patent Office 3,808,306
Patented Apr. 30, 1974

3,808,306
PROCESSES FOR RECOVERING URANIUM VALUES FROM ORES
Sydney Ernest Smith, Reading, Ruth Lapage, Basingstoke, and Keith Henry Garrett, Baughurst, England, assignors to United Kingdom Atomic Energy Authority, London, England
No Drawing. Filed Apr. 7, 1971, Ser. No. 132,201
Claims priority, application Great Britain, May 21, 1970, 24,769/70
Int. Cl. B01f 11/00; C01g 43/00
U.S. Cl. 423—20                    13 Claims

ABSTRACT OF THE DISCLOSURE

The present process provides an alternative to the dilute-acid process for recovering uranium values from refractory ores. Instead of fine-grinding the ore, it is comminuted to a relatively large top size (not substantially smaller than 1 mm.) and mixed with sufficient sulphuric acid of relatively strong concentration, suitably about 6 N, to wet the ore without forming a continuous liquid phase. Optionally, a curing agent may be added. The mixture is cured at an elevated temperature, up to about 100° C., for a relatively short time as compared with the dilute-acid process, and the uranium then eluted from the mixture by contacting with water. Provided the mixing results in adequate granulation, the elution can be effected by simple percolation through the cured ore bed.

BACKGROUND OF THE INVENTION

This invention relates to processes for recovering uranium values from uranium ores, especially from those ores which contain the uranium as finely disseminated refractory minerals.

Refractory minerals are those which cannot be dissolved in acid under ambient conditions at a practical rate. Examples of such refractory uranium minerals and the principal ores in which they occur are:

Brannerite in the conglomerate ores of the Blind River area of Canada, also known as the Elliot Lake area.

Secondary uraninite in the conglomerate ores of the Witwatersrand, South Africa.

Davidite in the South Australian ores.

Uranothorite and monazite in the granite and pegmatite ores of Canada, U.S., Sweden and Central Africa.

Conglomerate ores are made up of large discrete pebbles, typically of quartz ¼–2 inches in diameter, the space between the pebbles being filled by a matrix material which contains all the mineral values.

The present process is especially suitable for ores, such as those listed above, in which the refractory minerals are finely disseminated, unlike, for example, the U.S. sandstones in which the minerals are non-refractory and are not finely disseminated.

Most current uranium ore processing employs leaching in dilute (about 1 N) sulphuric acid; the only alternative in large-scale use is an alkaline leach for ores having a high content of acid-consuming constituents, such as carbonates. The dilute acid process, as applied to ores containing refractory minerals, such as the above Canadian conglomerate ores, requires 2–3 days leaching at 60–80° C. in agitated tanks to obtain 95% extraction. Because of the long residence-time in the agitated tanks, the latter are large and represent a major item of capital cost; they are rubber lined, but the agitators must either be made of special metals or replaced regularly. The other main disadvantage of this dilute-acid process is the need to fine grind the conglomerate ore (to at least 50% below 200 mesh (British Standard 410) i.e., 74 µm.), and the consequent cost of the liquid-solid separation stages after leaching.

The present invention provides an alternative process which:

(a) Eliminates the need for fine grinding;
(b) Eliminates the need for large agitated tanks;
(c) Can eliminate the need for a large-scale liquid/solid separation stage.

SUMMARY OF THE INVENTION

According to the present invention a process for recovering uranium values from an ore which contains the uranium as a finely disseminated refractory mineral or minerals, comprises the steps of:

Comminuting the ore to a top size not substantially smaller than 1 mm.;

Mixing the comminuted ore with sulphuric acid of normality greater than 4 N and in sufficient quantity to wet the ore without forming a continuous liquid phase;

Heating the mixture to an elevated temperature;

Allowing the mixture to cure for a period at an elevated temperature, and

Contacting the cured mixture with a liquid to elute the uranium.

Suitably, the normality of the acid is in the range 4 N–9 N, e.g., about 6 N. The amount of liquid added is insufficient to form a continuous liquid phase, i.e., no more liquid is added than can be retained in the pores of the bed of comminuted ore. The mixture thereby remains sensibly free-flowing, and does not reach a sticky state where high-shear mixing would be necessary. The amount of acid used suitably gives the mixture a liquid content of about 10% volume to weight, corresponding to about 12% weight to weight.

The size to which the comminution step reduces the ore is not critical, but the largest particles in the comminuted ore (the aforementioned top size) are not substantially smaller than 16 mesh (British Standard 410) (i.e., 1 mm.). Hence fine grinding of the ore is not required. Larger top sizes, e.g., 12 mesh BS (1.4 mm.), can be used with some ores with little loss of extraction efficiency. These relatively large particles are to be compared with the material (50% below 74 µm.) used in a dilute-acid process, for which a fine grinding step is required.

The mixing step may be performed in a manner to cause granulation of the comminuted ore particles. Tumbling the comminuted ore in a drum mixer will cause granulation. The elution step may be performed by percolating a suitable liquid, such as water, through the cured mixture, in which case granulation is important to obtain an adequate percolation rate. Granulation also renders the fine particles produced in the comminuting step less important, since these fines can thereby be agglomerated to a size suitable for percolation at a reasonable rate, or for elution by other known methods. The acid may be sprayed on to the moving surface of the ore in the mixer.

The curing times and temperatures are not critical and suitable economic combinations will depend on, for example, the type of ore and the availability of process heat. Temperatures in the range 65°–100° C. are preferred.

The ore may be heated by, for example, hot air or steam, preferably the latter. Live steam can be introduced into either the mixer or the curing container. As the steam increases the moisture content of the ore, the former mode of introduction may also increase the granulation effected by the mixer in a known manner. Ore heated in the mixer will normally be introduced into the curing container in sufficient bulk to retain adequate heat during curing. The dilution effect of the steam on the acid must be taken into account when determining the strength of the acid feed to the mixer, whether the steam is fed directly thereto or into the curing container.

The curing can be carried out in a container (or containers) into which the granulated mixture is transferred from the mixer. After curing, the container may be flooded with water to cover the mixture, and water thereafter percolated through the mixture by adding water above the ore bed and withdrawing it from below, or vice versa. The former method is preferred, because fewer slimes thereby appear in the elute liquor. In either method of percolation, no further filtration stage is required, other than a polishing filter if subsequent stages require this.

Although simple percolation is effective, other known methods of contacting the cured ore with a liquid to elute the uranium from the cured mixture can be used. The selection of the most appropriate method of elution will depend on economic considerations.

It is a feature of the present invention that a high extraction efficiency can be obtained without the addition of an oxidizing agent to the mixture, but such an agent may optionally be added to achieve a marginal further increase in the efficiency or to reduce the curing time if economic conditions so justify. The oxidizing agent can be added during mixing or after curing has commenced. In the latter case, using a long drum continuous mixer with a substantial residence time, e.g. 20 minutes or so, the oxidizing agent can be added halfway along the drum, e.g., about 10 minutes after the acid. Adding the oxidizing agent after curing has commenced requires less of the agent, as hereafter explained.

DESCRIPTION OF PREFERRED EMBODIMENTS

By way of example, the application of the present process to Canadian Elliot Lake ore will now be described. This ore considered of about 50% quartz pebbles of 1.5–5.0 cm. diameter, in a matrix of smaller quartz granules, sericite (a secondary mica), feldspar and some chlorites (Al, Fe and Mg silicates). It also contained considerable quantities of pyrites ($FeS_2$, 2–8%) and minor amounts of other sulphides. The principal uranium mineral was brannerite ($U_3Ti_5O_{16}$), with smaller amounts of thucholite (H, C, O), monazite (Ce, U. $PO_4$) and uraninite ($UO_2$). Typical samples contained about 0.1% uranium.

1 kg. lots of the above ore containing about 0.04% U were freshly ground to −16 mesh and mixed with 6 N $H_2SO_4$ in a drum mixer. The latter was 15 cm. in diameter by 20 cm. long and rotated on a horizontal axis at 60 r.p.m. The acid was added to the ore during rotation through a hole in one end of the drum via a tube which was moved to and fro along the drum length to ensure even dispersion of the acid. The drop-rate of the acid was adjusted so that it took about 5 minutes to add and the drum was then rotated for a further 5 minutes.

The amount of acid added was sufficient to wet the ore but insufficient to produce a continuous liquid phase. The rotary action of the mixer additionally caused agglomeration of the ore particles, particularly the fines, into granules.

After mixing, the ore was transferred to a cylindrical vessel 8 cm. in diameter by 35 cm. high for the curing stage. The ore was supported within the vessel on a 40 mesh stainless-steel screen. The lower end of the vessel was provided with a swan-neck outlet tube and the vessel was maintained at the desired temperature during curing by immersion in a water bath. After curing for 24 hours at 75° C. the uranium was eluted from the vessel by adding water at room temperature. The water was first run in with the outlet tube closed until the ore bed was completely flooded. Thereafter, the outlet tube was opened and water added the upper end of the vessel. The input and output rates were adjusted so that approximately 1 liter of water percolated through the ore bed per hour; this rate was found not to be critical.

The results of three runs in which 100, 80 and 60 cc., respectively, of 6 N acid were added in the mixer, are shown in Table 1. The extraction of uranium was about 94% in all three runs. As 60 cc. of 6 N acid per kg. ore is equivalent to 39 lb. acid per long ton, an actual reduction in acid consumption over the dilute-acid process (which normally requires about 60–80 lbs. per long ton) may be achieved. No oxidizing agent was used during these runs.

It will be seen that the elution stage was very efficient, a very large proportion of the uranium appearing in the first liter of the elute liquor. This was particularly true of the 80 and 60 cc. runs, in which the top of the ore bed was maintained just below the water level during elution.

The high extraction efficiency achieved is surprising in view of the known difficulty of processing such ores, which has previously required fine grinding and a lengthy residence time in the plant.

TABLE 1

Conditions:
1 kg. freshly ground, 0.04% U grade ore, −16 mesh
6 N $H_2SO_4$ for 24 hrs. at 75° C.

|  | Acid added in mixer | | |
| --- | --- | --- | --- |
|  | 100 cc. | 80 cc. | 60 cc |
| U content of ore (g.) | 0.489 | 0.431 | 0.397 |
| Elute liquor: | | | |
| 1st liter: | | | |
| U, g./l | 0.386 | 0.398 | 0.369 |
| Free $H_2SO_4$, g./l | 13.78 | 9.01 | 4.9 |
| Total dissolved solids, g | 9.33 | 10.14 | |
| Fe II, g./l | 0.78 | 1.13 | 1.03 |
| Fe III, g./l | 0.17 | 0.20 | |
| 2d liter: | | | |
| U, g./l | 0.051 | 0.005 | 0.002 |
| Free $H_2SO_4$, g./l | 2.17 | 0.196 | 0.059 |
| Total dissolved solids | 1.39 | 0.18 | |
| Fe II, g./l | 0.13 | 0.011 | <0.02 |
| Fe III, g./l | 0.01 | 0.007 | |
| 3d liter: | | | |
| U, g./l | 0.026 | 0.002 | 0.001 |
| Free $H_2SO_4$, g./l | 1.12 | 0.038 | <0.01 |
| Total dissolved solids | 0.74 | 0.06 | |
| Fe II, g./l | 0.066 | | |
| Fe III, g./l | 0.016 | | |
| Last liter: | | | |
| U, g./l | | 0.0003 | 0.0002 |
| Free $H_2SO_4$, g./l | | 0.001 | Nil |
| Total U extracted, percent | 94.5 | 94.0 | 93.8 |
| $H_2SO_4$ consumed, percent | 53 | 60 | 69 |

The effects of varying certain conditions in the present process will now be described, as obtained from other experimental runs.

PARTICLE SIZE

It was found that crushing the ore to −12 mesh reduced the extraction efficiency by about 3–5% as compared with crushing to −16 mesh, probably owing to retention of uranium in the larger particles.

ACID STRENGTH

The effect of varying the acid strength is shown in Table 2. These runs were performed on 100 g. samples crushed to −12 mesh to which 13.2 cc. acid were added, the curing time being 3 hours at 100° C. It will be seen that, within experimental error, the extraction efficiency was independent of acid strength between 5.5 N and 9 N.

TABLE 2

| $H_2SO_4$ normality: | Percent extraction |
|---|---|
| 3.0 | 78.4 |
| 3.5 | 81.2 |
| 4.0 | 84.4 |
| 4.5 | 86.4 |
| 5.0 | 87.1 |
| 5.5 | 89.5 |
| 6.0 | 89.2 |
| 6.5 | 89.2 |
| 7.0 | 90.0 |
| 7.5 | 90.4 |
| 9.1 | 91 |
| 18 | 72 |

TIME AND TEMPERATURE

The effect of curing temperature on extraction efficiency is shown in Table 3. These results must be combined with the effect of curing time shown in Table 4 to obtain the optimum economic conditions. For example, using 6 N acid, approximately the same extraction (91%) was obtained after 6 hours at 75° C. as after 3 hours at 100° C. (89.%). Raising the temperature above 100° C. did not increase the extraction efficiency.

TABLE 3

| | Percent extraction after 3 hours cure (particle size −12) | | | | |
|---|---|---|---|---|---|
| Acid strength (13.2 cc./100 g. ore) | 6 N | 7 N | 4.5 N | 9.1 N | 1.8 N |
| Temperature, °C.: | | | | | |
| 20 | | | 45 | 44 | 38 |
| 65 | 78.6 | 80.1 | | | |
| 70 | 79.9 | 82.6 | | | |
| 75 | 84.4 | 85.0 | | | |
| 80 | 86.0 | 86.0 | | | |
| 85 | 88.0 | 87.0 | | | |
| 100 | 89.2 | 90.0 | 90 | 91 | 72 |
| 115 | 86.8 | | | | |

TABLE 4

| Conditions (acid addition 13.2 cc./100 g. ore) | | | | Percent extraction after curing for— | | | | | |
|---|---|---|---|---|---|---|---|---|---|
| Temp. | Acid | Additive | Particle size | 3 hrs. | 6 hrs. | 12 hrs. | 24 hrs. | 73 hrs. | 120 hrs. |
| 20 | 4.5 N | | −12 | 45 | | | 71 | | |
| 20 | 9.1 N | | −12 | 44 | | | 76 | 88 | 81 |
| 20 | 18.0 N | | −12 | 38 | | | 58 | | |
| 75 | 6.0 N | | −12 | 84.8 | 91.0 | 95.2 | 95.5 | | |
| 100 | 9.1 N | | −12 | 91 | 92 | 92 | | | |
| 100 | 4.5 N | | −12 | 89 | 93 | | | | |

EFFECT OF OXIDANTS

In the dilute-acid process it is common practice to add an oxidizing agent to the ore to convert the U(IV) in the mineral to the more soluble U(VI). Sodium chlorate and manganese dioxide have been used for this purpose in earlier processes.

Table 5 shows the effect of adding sodium chloride and ferric sulphate in the present process for this purpose. Since reducing conditions prevail when the acid is first mixed with the ore, an excessive amount of oxidizing agent dissolved in the acid would be required if added at the beginning, otherwise it would not be effective to oxidize the ferrous ions formed later in the curing stage. The effect of adding the oxidant 1 hour (or in two cases 3 hours) after curing started is shown in the table. Other experiments have shown that this delay period may be reduced to about 10 minutes after addition of the acid. Tests showed that simply mixing in the solids was as effective as mixing in a solution of the oxidant. The results show that either oxidant may give a similar small improvement in extraction efficiency (about 2%), and that their combined use did not produce any further real improvement.

TABLE 5

| | Percent uranium extraction | | | | |
|---|---|---|---|---|---|
| | | | NaClO₃ | | NaClO₃, Fe₂SO |
| Conditions | No oxidant | Fe₂(SO₄)₃, 1 g./100 g. | 0.15 g./ 100 g. | 0.3 g./ 100 g. | 0.15 g./100 g. 1 g./100 g. |
| −12 mesh ore: | | | | | |
| 75° C., 3 hours | 84 | 88.1 | 87.9 | | |
| 100° C., 3 hours | 90 | 93.3 | 93.2 | | |
| −16 mesh ore: | | | | | |
| 75° C., 6 hours | 91.5 | 93.6 | 93.6 | | 94.1 |
| 75° C., 12 hours | 95.2 | | 94.6 | 95.9 | |
| 75° C., 24 hours | 95.3 | | 96.8 | | 97.2 |
| Do | ¹ 95.8 | | ² 96.8 | | |
| 100° C., 3 hours | 93.3 | 95.0 | 93.2 | 94.6 | 94.6 |
| 100° C., 6 hours | | | 94.8 | | 95.8 |
| 100° C., 12 hours | 95.4 | | 95.3 | 95.2 | |

¹ 7 cc. H₂O added 3 hrs. after curing started.
² NaClO₃ added in 7 cc. H₂O 3 hrs. after curing started.

ELUTE LIQUOR COMPOSITION

Table 6 shows that the present process is relatively selective for uranium. Thorium, cerium and titanium are extracted to a lesser degree, 67%, 12% and 4%, respectively. The amount of iron extracted is small, approximately the same by weight as the uranium. The main constituent of the liquor is aluminum, approximately twice the weight of uranium.

The ability to extract simultaneously valuable metals other than uranium from the ore with good efficiency is a useful feature of the present process. See, for example, the 67% extraction of thorium shown in Table 6. From another, similar ore, a simultaneous 97% extraction of thorium has been achieved.

TABLE 6

| Analysis | Cure: 3 hrs. at 100° C. (−12 mesh) | | | | | | Cure: 24 hrs. at 75° C. (−12 mesh) | |
|---|---|---|---|---|---|---|---|---|
| | 9 N | | 4.5 N | | 3.0 N | | 6 N | |
| | Liquor | Ore residue | Liquor | Ore residue | Liquor | Ore residue | Liquor | Liquor |
| Fe, g./100 g. ore | 0.137 | | 0.099 | | 0.093 | | 0.124 | 0.122 |
| U, g./100 g. ore | 0.103 | 0.021 | 0.104 | 0.012 | 0.09 | 0.025 | 0.112 | 0.114 |
| TiO₂, g./100 g. ore | 0.023 | 0.57 | 0.018 | 0.42 | 0.007 | 0.50 | 0.015 | 0.013 |
| Co, g./100 g. ore | 0.015 | 0.105 | 0.01 | 0.07 | 0.01 | 0.07 | 0.011 | 0.012 |
| Th, g./100 g. ore | 0.061 | 0.03 | 0.041 | 0.02 | 0.035 | 0.02 | 0.041 | 0.042 |
| PO₄, g./100 g. ore | 0.028 | | 0.008 | | 0.008 | | 0.0008 | 0.002 |
| Al, g./100 g. ore | | | | | | | 0.275 | |
| Ca, g./100 g. ore | | | | | | | 0.025 | |
| Mg, g./100 g. ore | | | | | | | 0.011 | |
| (SO₄), g./100 g. ore | | | | | | | 1.90 | 1.87 |
| Si, g./100 g. ore | | | | | | | 0.0003 | 0.0006 |
| H₂SO₄ consumed, percent | 39 | 92 | 51 | | 28 | | 60 | 60 |
| Total solids in liquor ignited to 700° C | 1.6 | | 1.09 | | | | | |
| Percent extraction: | | | | | | | | |
| U | 83.2 | | 89.3 | | 78.4 | | 95.3 | 95.8 |
| Th | 67 | | 67 | | 63 | | 66 | 66 |
| TiO₂ | 3.9 | | 4.1 | | 1.4 | | 4 | 4 |
| Ce | 12.5 | | 12.5 | | 12.5 | | 12 | 12 |
| Fe | ~4 | | ~4 | | ~4 | | ~4 | ~4 |

Table 7 shows results, comparable with those of Table 6, on a 1 kg. lot of Elliot Lake ore of higher grade (0.13% U) using the present process. In this case the curing temperature was 95° C., such a temperature being obtainable in a plant using live-steam heating. The curing time was reduced to 16 hours. No oxidizing agent was used.

TABLE 7

Conditions:
1 kg. 0.13% U grade ore, −16 mesh
6 N H₂SO₄ for 16 hrs. at 95° C.
Acid added in mixer, 100 cc.
U content of ore (g.), 12.82

| | 1st liter | 2d liter | 3d liter |
|---|---|---|---|
| Elute liquor: | | | |
| U, g./l | 1.156 | 0.060 | 0.028 |
| Free H₂SO₄ g./l | 7.76 | 0.15 | nil |
| Total dissolved solids | 16.62 | 1.00 | 0.46 |
| Iron, g./l | 1.58 | 0.09 | 0.01 |
| Total U extracted, percent | | 95.9 | |
| H₂SO₄ consumed, percent | | 73.0 | |

The results in Table 7 show that the process is applicable to ores of the grade currently being extracted by the dilute-acid process.

It has been found that, with certain ores, it is desirable to use a slightly acid liquor to elute the uranium. When percolating one ore, for example, only about 92% of the total uranium eventually eluted was obtained in the first volume passed through the ore bed, using water. The use of 0.1 N H₂SO₄ (containing about 5 g./l. H₂SO₄) instead of water raised this figure to about 97%. The acidity of the liquor is thought to prevent precipitation of dissolved uranium on to the ore bed.

As might be expected, the efficiency of extraction can be increased by heating the water or acid used to elute the uranium. For example the above weak acid liquor has been used at 75° C. with improved results. Whether or not to use a heated liquor will depend on economic considerations.

It will be understood that the above results relate to particular ores and that for other ores different results may be obtained. The selection of suitable conditions for any particular ore is a matter of routine experiment.

It will be further understood that the above results relate to laboratory-scale extraction, but it will be readily apparent to those skilled in the chemical engineering art that the process may readily be scaled up for plant use. Where elution is to be effected by percolation, suitable mixer/granulators are known, for example, as used for fertilizer granulation and iron ore pelletizing, into which the acid can be sprayed. Instead of using external heating (the water-bath) to raise the ore/acid mixture to the curing temperature as described, hot air or steam can be used, as hereinbefore described.

We claim:

1. A process for recovering uranium values from an ore which contains uranium as a finely disseminated refractory mineral or minerals comprising the steps of:

comminuting the ore to a top size not substantially smaller than 1 mm. up to not substantially larger than 1.4;

mixing the comminuted ore with sulphuric acid of normality greater than 4 N in sufficient quantity to wet the ore without forming a continuous phase and provide a mixture that remains free-flowing and does not reach a sticky state;

heating the mixture to an elevated temperature to cure the mixture not substantially above 100° C.;

and contacting the cured mixture with an aqueous liquid to elute the uranium.

2. A process as claimed in claim 1 wherein the aqueous acid normality is approximately 6 N.

3. A process as claimed in claim 1 wherein the liquid content of the mixture is about 10% volume to weight.

4. A process as claimed in claim 1 wherein the mixing is effected by tumbling to cause granulation.

5. A process as claimed in claim 4 wherein the acid is sprayed on to the surface of the ore in a drum mixer.

6. A process as claimed in claim 1 wherein the ore is heated by introducing hot air or steam into the mixture.

7. A process as claimed in claim 6 wherein the ore is heated to a temperature in the range 65–100° C.

8. A process as claimed in claim 1 wherein an oxidizing agent is included in the mixture during mixing or after curing has commenced.

9. A process as claimed in claim 1 wherein, after mixing, the mixture is transferred to a curing container for said curing.

10. A process as claimed in claim 9 wherein, after curing, said aqueous liquid is percolated through the mixture in the said curing container to elute the uranium.

11. A process as claimed in claim 10 wherein percolation is effected by adding the aqueous liquid above the ore in the container and withdrawing it from below.

12. A process as claimed in claim 11 wherein the aqueous liquid used to elute the uranium is water.

13. A process as claimed in claim 12 where the water is made slightly acid.

(References on following page)

References Cited

UNITED STATES PATENTS

| | | | |
|---|---|---|---|
| 3,250,589 | 5/1966 | Meyer | 23—312 M E |
| 2,875,023 | 2/1959 | Galvanek | 23—321 |
| 1,098,282 | 5/1914 | McCoy | 23—321 |
| 2,894,809 | 7/1959 | McCullough et al. | 23—321 |
| 2,869,980 | 1/1959 | Grinstead | 23—321 |
| 3,288,569 | 11/1966 | Henrickson et al. | 23—321 |

OTHER REFERENCES

Woody et al., Uranium Ore Processing, Clegg et al. ed., Addison-Wesley Publ. Co., Mass., 1958, pp. 134–36—TN 490.U7 C.55.

CARL D. QUARFORTH, Primary Examiner

F. M. GITTES, Assistant Examiner

U.S. Cl. X.R.

23—312 M E; 423—10, 18